United States Patent
Ganesan et al.

(10) Patent No.: US 11,422,744 B2
(45) Date of Patent: Aug. 23, 2022

(54) NETWORK-WIDE IDENTIFICATION OF TRUSTED DISK GROUP CLUSTERS

(71) Applicant: Dell Products, L.P., Round Rock, TX (US)

(72) Inventors: Vaideeswaran Ganesan, Bangalore (IN); Deepaganesh Paulraj, Bangalrore (IN); Vinod P S, Bangalore (IN); Ankit Singh, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/984,502

(22) Filed: Aug. 4, 2020

(65) Prior Publication Data
US 2022/0043598 A1    Feb. 10, 2022

(51) Int. Cl.
　　*G06F 3/06*　　(2006.01)
　　*G06F 9/455*　　(2018.01)

(52) U.S. Cl.
　　CPC .......... *G06F 3/0659* (2013.01); *G06F 3/0604* (2013.01); *G06F 3/0689* (2013.01); *G06F 9/45558* (2013.01); *G06F 2009/45583* (2013.01); *G06F 2009/45595* (2013.01)

(58) Field of Classification Search
　　CPC .. G06F 3/0659; G06F 9/45558; G06F 3/0689; G06F 3/0604; G06F 2009/45595; G06F 2009/45583; G06F 3/067; G06F 2009/45587; H04L 67/1097

USPC ................................... 711/112, 111
See application file for complete search history.

(56) References Cited

U.S. PATENT DOCUMENTS

| | | | |
|---|---|---|---|
| 2004/0088639 A1* | 5/2004 | Mecklenbraeuker | H04L 1/1819 714/776 |
| 2007/0234402 A1* | 10/2007 | Khosravi | H04L 63/0227 726/2 |
| 2012/0084626 A1* | 4/2012 | Pandey | G06F 3/0632 714/758 |
| 2018/0332065 A1* | 11/2018 | Gupta | H04L 63/101 |
| 2020/0143047 A1* | 5/2020 | Shivanna | H04L 9/3247 |

\* cited by examiner

*Primary Examiner* — Daniel D Tsui
*Assistant Examiner* — Zubair Ahmed
(74) *Attorney, Agent, or Firm* — Fogarty LLP (57) ABSTRACT

In data storage systems, pooled storage resources may be organized into logical disk groups. Adding an additional disk group to such data storage systems requires identifying a suitable disk group from numerous candidates that may be available to the data storage system via a network. Embodiments identify IHSs (Information Handling Systems), such as rack-mounted servers installed within a data center, that include available disk groups. The servers with available disk groups are classified based on various trust parameters, such as their security settings and their hardware and software configurations. Based on the number of trust parameters with which the servers are classified, the servers are ranked, thus indicating their suitability for providing trusted disk groups to the storage system. Available disk groups from the top ranked server may be designated for use by the storage system.

19 Claims, 3 Drawing Sheets

NETWORK-WIDE IDENTIFICATION OF TRUSTED DISK GROUP CLUSTERS

FIELD

This disclosure relates generally to Information Handling Systems (IHSs), and more specifically, to IHSs supporting data storage systems.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Groups of IHSs may be housed within data centers. A data center may include a large number of IHSs, such as servers that are installed within a chassis and then stacked within slots provided by racks. In such data center configurations, resources may be pooled and shared by one or more IHSs. For instance, storage resources may be pooled and shared across a network fabric to form a storage area network (SAN). In some instances, the pooled storage resources of a SAN may be selected from a group of server IHSs that may be referred to as cluster. In addition to utilizing pooled resources, the software applications running on these server IHSs may operate within virtualized software environments that rely on abstractions of the underlying IHS hardware, thus allowing the hardware to be administered, and in some cases replaced, without affecting the operation of the software applications running in the virtualized environments. In some instances, data storage resources may be virtualized in this manner. In particular, a virtual storage area network (vSAN) utilizes a logical partition of storage drives within a SAN, where the vSAN provides virtualized access to a pool of storage drives within a SAN. In some instances, a vSAN may leverage the virtualization of storage drives by utilizing groups of storage drives, that may be referred to as disk groups, as a single, logical storage drive.

SUMMARY

In various embodiments, data storage systems include a first cluster of (Information Handling Systems), each comprising a plurality of disk groups providing storage capacity to the storage system. The data storage system may be configured to: detect a request for an additional disk group to be added to the data storage system; identify a plurality of external IHSs that are not members of the cluster and that are accessible by the storage system via a first network, wherein the external IHSs include one or more disk groups available for assignment; classify the plurality of external IHSs based on a plurality of trust parameters of the external IHSs; rank the plurality of external IHSs based on the classification, wherein the top ranked external IHSs is classified according to the greatest number of trust parameters; and identify a disk group of the top ranked of the external IHSs for use by the storage system.

In additional data storage system embodiments, the data storage system comprises a vSAN (virtual Storage Area Network) storage system. In additional data storage system embodiments, the trust parameters comprise a plurality of BIOS settings of an external IHS. In additional data storage system embodiments, the trust parameters comprise use of a TPM (Trusted Platform Module) controller by an external IHS. In additional data storage system embodiments, the trust parameters comprise network devices utilized by an external IHS. In additional data storage system embodiments, the plurality of external IHSs each comprise a remote access controller providing remote management and monitoring of a respective IHS, and wherein the remote access controllers collect trust parameters from a respective IHS. In additional data storage system embodiments, wherein the remote access controllers utilize a plurality of sideband monitoring connections for collecting the trust parameters from a respective external IHS. In additional data storage system embodiments, a designated remote access controller of a first IHS of the first cluster collects the trust information from the remote access controllers of the external IHSs.

In various additional embodiments, IHSs (Information Handling Systems) are provided that are a member of a first cluster of IHSs that implement a data storage system comprising a plurality of disk groups providing storage capacity. The IHSs may be configured to: detect a request for an additional disk group to be added to the data storage system; identify a plurality of external IHSs that are not members of the cluster and that are accessible via a first network, wherein the external IHSs include one or more disk groups available for assignment; classify the plurality of external IHSs based on a plurality of trust parameters of the external IHSs; rank the plurality of external IHSs based on the classification, wherein the top ranked external IHSs is classified according to the greatest number of trust parameters; and identify a disk group of the top ranked of the external IHSs for use by the storage system.

In additional IHS embodiments, the data storage system comprises a vSAN (virtual Storage Area Network) storage system. In additional IHS embodiments, the trust parameters comprise a plurality of BIOS settings of an external IHS. In additional IHS embodiments, the trust parameters comprise use of a TPM controller by an external IHS. In additional IHS embodiments, the trust parameters comprise network devices utilized by an external IHS. In additional IHS embodiments, the plurality of external IHSs each comprise a remote access controller providing remote management and monitoring of a respective IHS, and wherein the remote access controllers collect trust parameters from a respective IHS.

In various additional embodiments, methods are provided for supporting a data storage system comprising a first cluster of IHSs, each comprising a plurality of disk groups providing storage capacity to the storage system. The methods may include: detecting a request for an additional disk group to be added to the data storage system; identifying a plurality of external IHSs that are not members of the cluster and that are accessible by the storage system via a first network, wherein the external IHSs include one or more disk groups available for assignment; classifying the plurality of external IHSs based on a plurality of trust parameters of the external IHSs; ranking the plurality of external IHSs based on the classification, wherein the top ranked external IHSs is classified according to the greatest number of trust parameters; and identifying a disk group of the top ranked of the external IHSs for use by the storage system.

In additional method embodiments, the data storage system comprises a vSAN (virtual Storage Area Network) storage system. In additional method embodiments, the trust parameters comprise a plurality of BIOS settings of an external IHS. In additional method embodiments, the trust parameters comprise use of a TPM (Trusted Platform Module) controller by an external IHS. In additional method embodiments, the trust parameters comprise network devices utilized by an external IHS. In additional method embodiments, the plurality of external IHSs each comprise a remote access controller providing remote management and monitoring of a respective IHS, and wherein the remote access controllers collect trust parameters from a respective IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. It should be appreciated that although certain IHSs described herein may be discussed in the context of enterprise computing servers, other embodiments may be utilized.

As described, in a data center environment, a server IHS may be installed within a chassis, in some cases along with other similar server IHSs. Such servers IHSs may utilize pooled resources, such as pools of shared storage drives. Pooled storage drives may be virtualized and utilized by software applications operating within virtualized software environments, such as vSANs, that run on a server IHS. In particular, pooled storage drives may be organized into disk groups, where each disk group may be utilized by a vSAN as a single logical storage drive. In order to improve the performance of these disk groups, one of the drives of a group may be designated for use as a read and write buffer for storage operations that are directed to the remaining drives of the disk group that are configured to provide permanent storage.

During operation of such storage systems, new disk groups may be added to the pool of storage drives that are in use. In some instances, new disk groups may be added in order to increase the storage capacity of a storage system. In some instances, new disk groups may be added in order to replace disk groups that are taken out of service, either due to malfunctions or as part of regular maintenance operations. In some storage systems, such as a vSAN, a disk group can be reliably added to the pool as long as the disk group can be accessed via a cluster of server IHSs that have been configured to participate in the storage system. However, in some instances, no disk groups are available within the cluster of servers configured for use by the storage system. Disk groups may nonetheless be available outside of this cluster. In a data center environment, disk groups may be added from outside of the cluster as long as the are accessible via the data center network.

Since a data center network may include large numbers of servers and multiple disk groups may be available via each server, identifying disk groups throughout such a network that are available for adding to a storage system may be a difficult task for administrators. Administrators face an even more difficult task in identifying the most suitable disk group to add to particular storage system from the numerous disk groups that may be available. In addition, it is preferable to select the most trustworthy of the available disk groups when adding disk groups to a storage system. In scenarios where disk groups are being added from outside of a cluster utilized by the storage system, identifying the most trusted of the available disk groups is especially important in order mitigate the possibility of the storage system being compromised via a disk group that is external to the storage system cluster.

Figure 1:
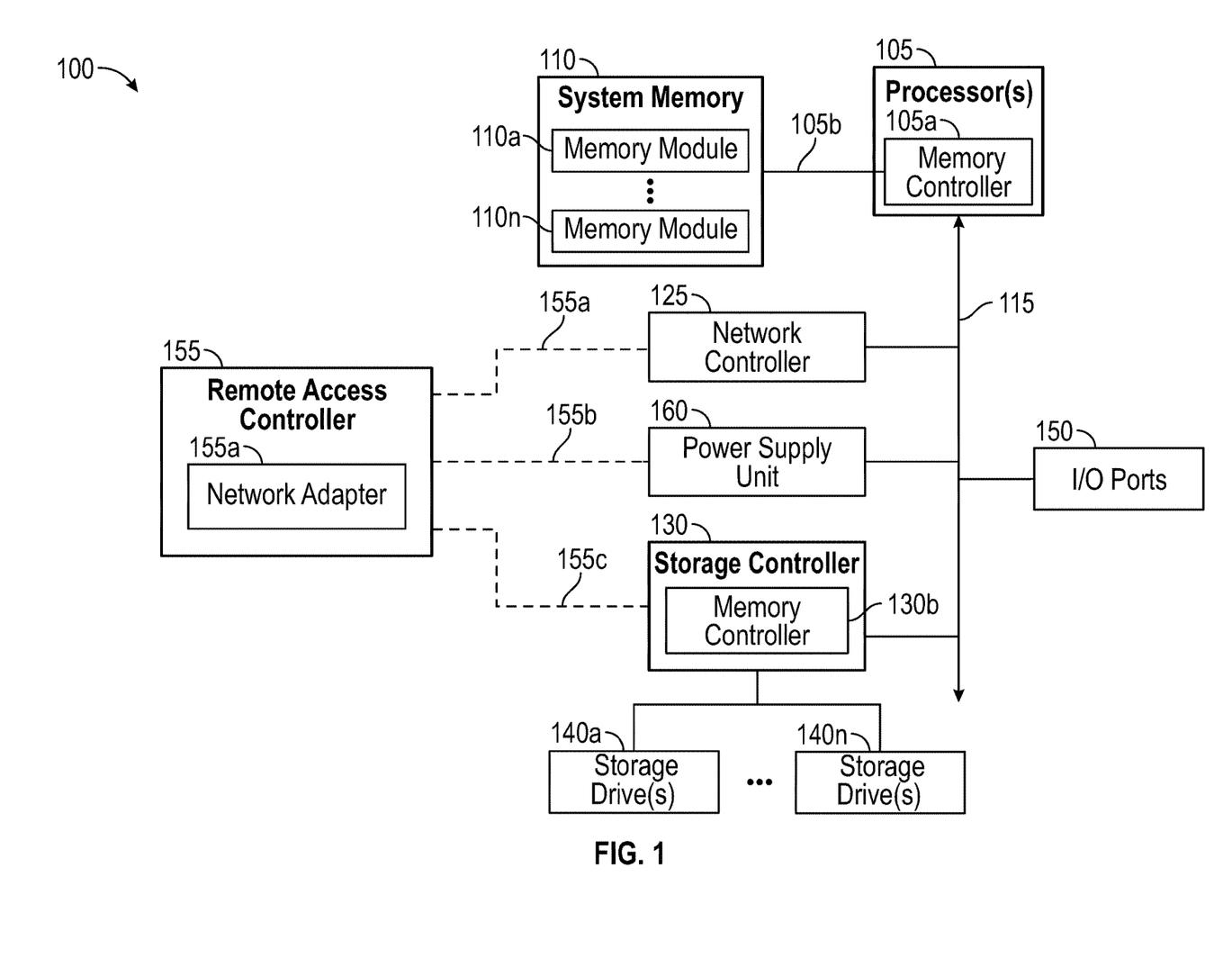
FIG. 1 is a block diagram illustrating certain components of an IHS configured according to various embodiments to support network-wide identification of trusted disk groups.

FIG. 1 illustrates certain components of an IHS 100 configured according to various embodiments to support identification of trusted disk groups within a data center network. Although the embodiments provided herein describe an IHS that is a rack-mounted server, other embodiments may be implemented using other types of IHSs. In the illustrative embodiment of FIG. 1, IHS 100 may be a server that would typically be installed within a chassis, that in turn would be typically installed within slots of a rack. Installed in this manner, IHS 100 may utilize certain shared resources provided by the chassis and/or rack, such as power and networking. In some embodiments, multiple servers such as IHS 100 may be installed within a single chassis. For instance, IHS 100 may be a 1RU (Rack Unit) server that is paired with a similar 1RU component, such as another server similar to IHS 100, and may be installed with a 2RU chassis.

IHS 100 may include one or more processors 105. In some embodiments, processors 205 may include a main processor and a co-processor, each of which may include a plurality of processing cores. As illustrated, processor(s) 105 may include an integrated memory controller 105a that may be implemented directly within the circuitry of the processor 105, or the memory controller 105a may be a separate integrated circuit that is located on the same die as the processor 105. The memory controller 105a may be configured to manage the transfer of data to and from the system memory 110 of the IHS 105 via a high-speed memory interface 105b.

System memory 110 may include memory components, such as such as static RAM (SRAM), dynamic RAM (DRAM), NAND Flash memory, suitable for supporting high-speed memory operations by the processor(s) 105. System memory 110 may combine both persistent, non-volatile memory and volatile memory. In certain embodiments, the system memory 110 may be comprised of multiple removable memory modules. The system memory 110 of the illustrated embodiment includes removable memory modules 110a-n. Each of the removable memory modules 110a-n may utilize a form factor corresponding to a motherboard expansion card socket that receives a type of removable memory module 110a-n, such as a DIMM (Dual In-line Memory Module). Other embodiments of IHS system memory 110 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may operate using a chipset that may be implemented by integrated circuits that couple processor 105 to various other components of the motherboard of IHS 100. In some embodiments, all or portions of the chipset may be implemented directly within the integrated circuitry of an individual processor 105. The chipset may provide the processor(s) 105 with access to a variety of resources accessible via one or more buses 115. Various embodiments may utilize any number of buses to provide the illustrated pathways provided by the single illustrated bus 115. In certain embodiments, bus 115 may include a PCIe (PCI Express) switch fabric that is accessed via a root complex and coupled processor 105 to a variety of internal and external PCIe devices.

In various embodiments, a variety of resources may be coupled to the processor(s) 105 of the IHS 100 via buses 115 managed by the processor chipset. In some cases, these resources may be components of the motherboard of IHS 100 or these resources may be resources coupled to IHS 100, such as via I/O ports 150. In some embodiments, IHS 100 may include one or more I/O ports 150, such as PCIe ports, that may be used to couple the IHS 100 directly to other IHSs, storage resources or other peripheral components. In certain embodiments, the I/O ports 150 may provide couplings to a backplane or midplane of the chassis in which the IHS 100 is installed. In some instances, I/O ports 150 may include rear-facing externally accessible connectors by which external systems and networks may be coupled to IHS 100.

As illustrated, IHS 100 includes a remote access controller (RAC) 155 that provides capabilities for remote monitoring and management of various aspects of the operation of IHS 100. In support of these monitoring and management functions, remote access controller 155 may utilize both in-band and sideband (i.e., out-of-band) communications with various internal components of IHS 100. Remote access controller 155 may additionally implement a variety of management capabilities. In some instances, remote access controller 155 operate from a different power plane from the processors 105, storage drives 140a-n and other components of IHS 100, thus allowing the remote access controller 155 to operate, and management tasks to proceed, while the processing cores of IHS 100 are powered off. Various BIOS functions, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

In some embodiments, remote access controller 155 may include a service processor, or specialized microcontroller, that operates management software that supports remote monitoring and administration of IHS 100. Remote access controller 155 may be installed on the motherboard of IHS 100 or may be coupled to IHS 100 via an expansion slot provided by the motherboard. In some embodiments, remote access controller 155 may support monitoring and administration of various managed devices 125, 130, 160 of an IHS via a sideband bus interface. For instance, messages utilized in device management may be transmitted using I2C sideband bus connections 155a-c that may be individually established with each of the respective managed devices 125, 130, 160 through the operation of an I2C multiplexer of the remote access controller 155.

In support of remote monitoring functions, remote access controller 155 may include a network adapter 155a may support connections with remote management tools using wired and/or wireless network connections via a variety of network technologies. The network access provided by network adapter 155a is limited to use by remote access controller 155 and is distinct from the network access provided to IHS 100 by network controller 125. As described in additional detail with regard to FIG. 2, in some embodiments, the network access provided by network adapter 155a may be utilized by remote access controller 155 in communicating trust characteristics with other remote access controllers that are part of the same data center network as IHS 100. Based on these trust characteristics that are collected and communicated by remote access controllers operating within a data center network, such as remote access controller 155, a trust profile may be established for servers within the network that have disk groups available for assignment.

As illustrated, IHS 100 may also include a power supply unit 160 that provides the components of the chassis with appropriate levels of DC power. The power supply unit 160 may receive power inputs from an AC power source or from a shared power system that is provided by a rack within which IHS 100 may be installed. In certain embodiments, power supply unit 160 may be implemented as a swappable component that may be used to provide IHS 100 with redundant, hot-swappable power supply capabilities. As illustrated, power supply unit 160 may include a sideband management connection 155b with remote access controller 155. Based on inputs provided by this sideband management connection 155b, power supply unit 160 may implement various power modes that may be remotely monitored and managed.

As illustrated, processor(s) 105 may also be coupled to a network controller 125, such as provided by a Network Interface Controller (NIC) that is coupled to the IHS 100 and allows the IHS 100 to communicate via an external network, such as the Internet or a LAN. Network controller 125 may include various microcontrollers, switches, adapters, and couplings used to connect IHS 100 to a network, where such connections may be established by IHS 100 directly or via shared networking components and connections provided by a rack in which chassis 100 is installed. In some embodiments, network controller 125 may allow IHS 100 to interface directly with network controllers from other nearby IHSs in support of clustered processing capabilities that utilize resources from multiple IHSs. As with power supply unit 160, network controller 125 may include a sideband management connection 155a with remote access controller 155, where this sideband connection 155a may be used for remote monitoring and management of the network controller's operations.

In some embodiments, remote access controller 155 may utilized this sideband management connection 155a to collect information used for evaluating the trust characteristics of IHS 100. For instance, in some embodiments, network controller 125 may issue queries to determine the network switches, or network access devices, by which IHS 100 is connected to external networks. For example, network connections via certain known switches may be deemed more trustworthy, while connections via certain untrusted or unknown switches may be deemed untrustworthy. In some embodiments, network controller 125 may collect network information regarding network domains or directory services in which IHS 100 is a member. Network domains may implement various security policies for authenticating members of the network. As such, certain recognized network domains that implement robust security protocols may be trusted, while IHSs that are members of domains with unknown or inadequate security protocols may deemed untrustworthy. In some embodiments, network controller 125 may respond to queries from remote access controller 155 by collecting and providing such network information for use in evaluating the trust characteristics of IHS 100. As described in additional detail below, based on such trust characteristics, IHS 100 may be classified based on its suitability for contributing disk groups available within storage drives 140a-n for use by a data storage system.

IHS 100 may include one or more storage controllers 130 that may be utilized to access storage drives 140a-n that are accessible via the chassis in which IHS 100 is installed, and, in some cases, to access remote storage drives installed in other chassis that may be within the same rack or in a different rack of a data center, such as within other IHSs that are part of the same logical cluster as IHS 100. Although a single storage controller 130 is illustrated in FIG. 1, IHS 100 may include multiple storage controllers that may be configured identically or in different configurations. As described, in some embodiments, some or all of the storage drives 140a-n accessed via IHS 100 may be logically grouped into disk groups, where each group may be utilized as a single, logical storage drive. Some disk groups may be hybrid disk groups that include both solid-state drives (SDDs) and magnetic hard-disk drives (HDDs). In such hybrid disk groups, the SDD may be used as a cache drive and the HDDs may be used for permanent data storage. In a vSAN configuration, multiple such disk groups available within a cluster of IHSs may be collectively utilized to provide a storage solution supporting large storage capacities, high availability and data redundancy by applications operating within virtualized operating environments.

In some embodiments, a storage controller 130 of IHS 100 may provide support for RAID (Redundant Array of Independent Disks) configurations of logical and physical storage drives 140a-n. In some embodiments, a storage controller 130 of IHS 100 may be an HBA (Host Bus Adapter) that provides more limited capabilities in accessing physical storage drives 140a-n. In many embodiments, storage drives 140a-n may be replaceable, hot-swappable storage devices that are installed within bays provided by the chassis in which IHS 100 is installed. In some embodiments, storage drives 140a-n may also be accessed by other IHSs that are also installed within the same chassis as IHS 100. For instance, when installed within a 2RU chassis, IHS 100 may be a 1RU component of the chassis that is able to access storage drives 140a-n along with another 1RU IHS that is also installed within a slot of the 2RU chassis. In embodiments where storage drives 140a-n are hot-swappable devices that are received by bays of chassis, the storage drives 140a-n may be coupled to IHS 100 by connectors provided by the individual bays to a midplane of IHS 100. In various embodiments, storage drives 140a-n may include SAS (Serial Attached SCSI) magnetic disk drives, SATA (Serial Advanced Technology Attachment) magnetic disk drives, solid-state drives (SSDs) and other types of storage drives in various combinations. As with processor(s) 105, storage controller 130 may also include an integrated memory controller 130b that may be used to manage the transfer of data to and from available caches, such as the cache drives of disk groups that are managed by storage controller 130.

As with power supply unit 160 and network controller 125, storage controller 130 may include a sideband management connection 155c with remote access controller 155, where this sideband connection 155c may be used for remote monitoring and management of the storage controller's operations. For instance, as described in additional detail below, remote access controller 155 may utilize sideband connection 155c for collecting trust parameter information that are used in classifying IHS 100 for suitability in contributing disk groups from storage drives 140a-n for use by a data storage system. For example, storage controller 130 may collect information regarding security protocols utilized by the storage drives of available disk groups, such as encryption protocols supported by the storage drives of the disk group. For instance, the storage controller 130 report that one or more available disk groups are bound to IHS 100 via authentication by a TPM cryptographic processor of IHS 100. Such disk groups could be relocated to a different IHS, but their contents can only be deciphered using the TPM of IHS 100. In some embodiments, storage controller 130 may respond to queries from remote access controller 155 by collecting and providing such disk group security policy information for use in evaluating the trust characteristics of IHS 100.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip.

Figure 2:
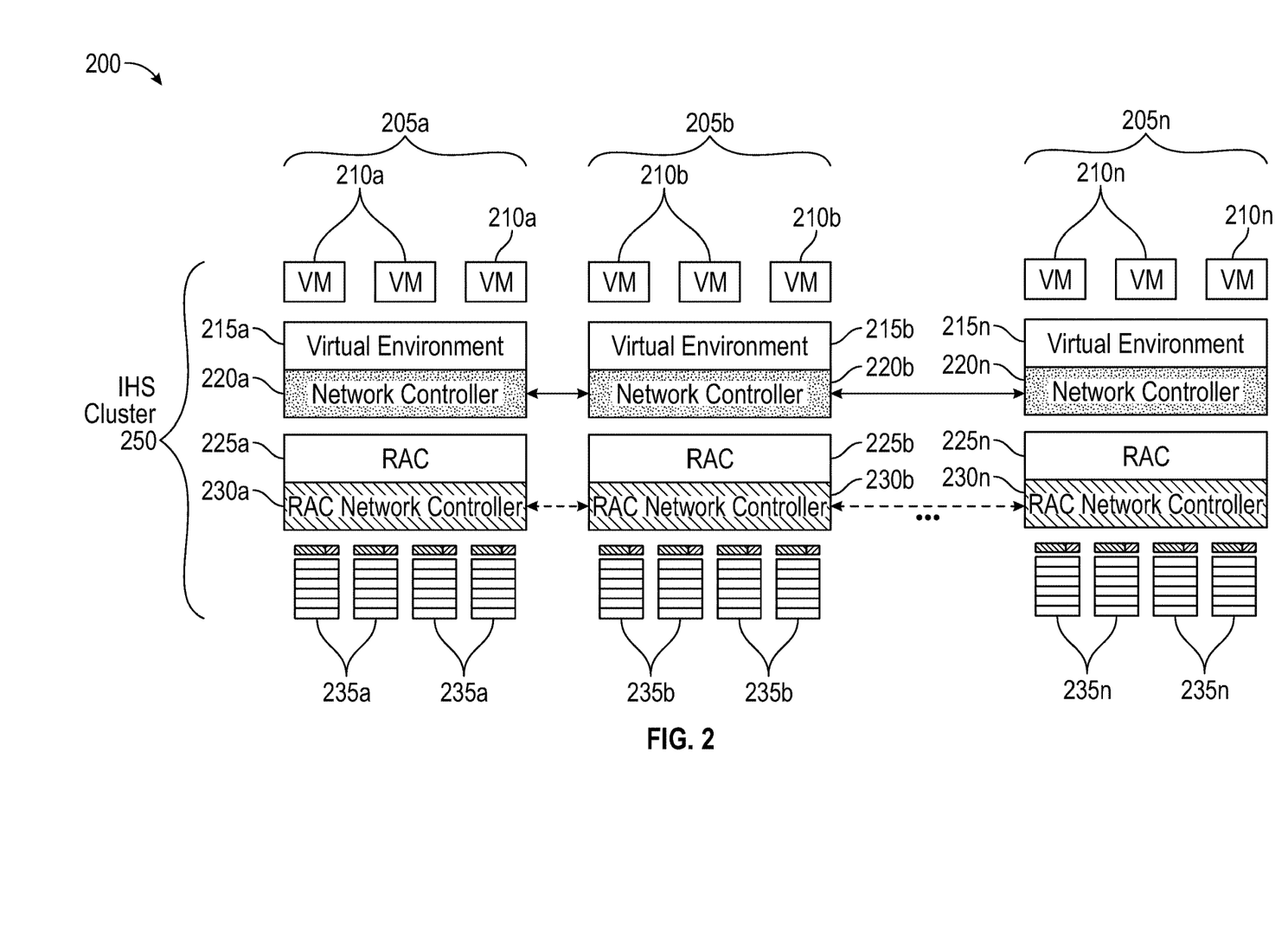
FIG. 2 is block diagram illustrating certain components of a data storage system configured according to various embodiments to support network-wide identification of trusted disk groups.

FIG. 2 is block diagram illustrating certain components of a storage system 200, such as a vSAN storage system, configured according to various embodiments to support network-wide identification of trusted disk groups. As illustrated, storage system 200 is comprised of a cluster 250 of server IHSs 205a-n that each contribute storage drives to the pool of storage resources used by storage system 200. In particular, each server of cluster 250 includes a collection of disk groups 235a-n that are part of the pool of storage capacity available to the storage system 200. In some embodiments, a cluster 250 of servers may be arranged within one or more racks of a data center, where the IHSs 205a-n that comprise the cluster 250 may be similar servers, but may nonetheless include some variation in hardware and may be configured differently.

In the illustrated embodiment, each of the server IHSs 205a-n may support multiple virtual machines 210a-n that operate within a virtualized operating environment 215a-n, such as a hypervisor. The virtual machines 210a-n provide independent execution spaces in which applications may operate in virtual isolation while sharing the same underlying server hardware, such as the hardware of server IHS embodiments described with regard to FIG. 1. The virtual machines 210a-n may be utilized in supporting a wide variety of computing applications that may range from personal use to enterprise support for commercial and scientific activities. Operating within the virtualized environment 215a-n, the virtual machines 210a-n may utilize storage resources provided by each respective server 205a-n. A storage system 200 according to embodiments, such as a vSAN system, provides use of storage capabilities within a virtualized environment 215a-n, where the storage capabilities are provided to virtual machines 210a-n as logical abstractions, while the virtual environments 215a-n interoperate with the physical storage capabilities that are accessible via the hardware of the servers 205a-n.

In order for storage system 200 to utilize the resources of each of the servers 205a-n of cluster 250, each of the servers 205a-n may be interconnected via a network, such as a PCIe switch fabric, that is accessed by each of the servers 205a-n using network controllers 220a-n, such as described with regard to FIG. 1. Using the capabilities provided by network controllers 220a-n, each of the individual servers 205a-n may route storage operations to disk groups 235a-n on the other servers 205a-n within cluster 250. Utilized in this manner, network controllers 220a-n support a virtualized storage network backed by the shared pool of disk groups 235a-n within cluster 250.

As described, each disk group 235a-n may be a logical collection of multiple storage drives that is operated as a single storage volume that aggregates the capacity of the storage drives of the disk group. In some instances, each of the disk groups 235a-n includes a dedicated cache drive and a collection of capacity drives. In many instances, the dedicated cache drives of each disk group may be implemented using solid-state drives and the capacity drives of each disk group may be implemented using hard disk drives. Such configurations utilize more expensive and faster solid-state drives to support caching, while utilizing slower and cheaper hard disk drives for permanent storage capacity.

As described with regard to FIG. 1, a server IHS 205-an may include a remote access controller 225a-n that supports remote monitoring and management of an IHS. Also as described with regard to FIG. 1, a remote access controller 155 may include a network adapter 155a that is used to support the monitoring and management tasks implemented by the remote access controller. As indicated in FIG. 2, the remote access controllers 225a-n of each IHS 205a-n may utilize this dedicated remote management network controller 230a-n to interoperate with the other remote access controllers 225a-n of other servers within cluster 250. As described in additional detail below, the capabilities of remote access controllers may be utilized to collect trust parameters related to disk groups that are available for use within cluster 250, where the collected information is used to identify disk groups that are suited for being incorporated into a storage system cluster that has no available disk groups but requires a replacement disk group or is being expanded to include additional disk group capacity.

Figure 3:
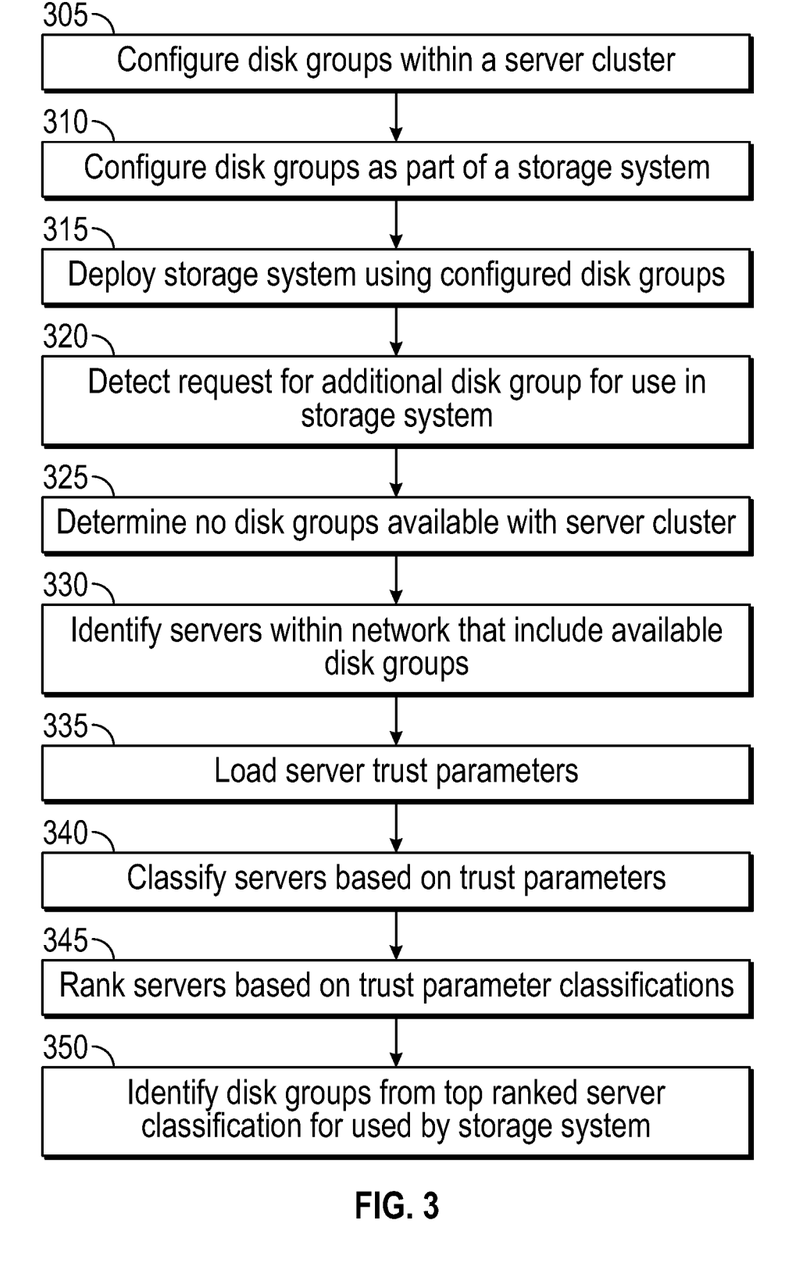
FIG. 3 is a flowchart diagram illustrating certain steps of a method according to various embodiments for network-wide identification of trusted disk groups.

FIG. 3 is a flowchart diagram illustrating certain steps of a method according to various embodiments that provides network-wide identification of trusted disk groups for addition to a storage system cluster. In configuring a data storage system such as described with regard to FIG. 2, embodiments may begin at block 305 with the configuration of logical disk groups within a cluster of server IHSs that have been configured for use by the data storage system. In some embodiments, each of the logical disk groups may include a dedicated solid-state drive dedicated for caching operations and a collection of hard disk drives used for permanent storage capacity. In many embodiments, all of the storage drives that comprise a disk group will be installed within the same server IHS or within a single chassis that houses multiple IHSs, such as a 2 RU chassis that houses two individual 1 RU server IHSs. At block 310, the disk groups are configured as members of the data storage system. In some embodiments, all of the disk groups configured for use by a data storage system may be accessed via a single server IHS. However, in most embodiments, the disk groups configured for use in a data storage system are distributed among a cluster of servers that are part of the storage system, such as cluster 250 of FIG. 2. At block 315, the configured data storage system is deployed and placed into operation, such as within a data center.

At block 320, a request for adding an additional disk group to the data storage system may be detected. In some instances, an additional disk group may be requested in order to replace a disk group that has failed or is being taken out of service due to telemetry data indicating a failure within the disk group is increasingly likely. In other instances, an additional disk group may be requested as part of regular maintenance schedules that periodically replace a disk group after being in service for a certain duration. In other instances, an additional disk group may be requested in order to increase the storage capacity of the data storage system. In some embodiments, a request for an additional disk group may be detected by a remote access controller of the data storage system that has been designated with additional management responsibilities, including the identification of trusted disk groups that are available within a network that is accessible by the data storage system. Accordingly, in some embodiments, at block 325, any available disk groups within the cluster of server IHSs that are configured for use by the data storage system are identified.

If no disk groups are available within the local cluster of the data storage system, at block 330, the designated remote access controller may then identify available disk groups outside of the local cluster, such as within a network that is configured within a data center. In some embodiments, the parameters remote access controller may identify such available disk groups, and trust parameters associated with these disk groups, through direct queries to remote access controllers operating within the network that is being searched for available disk groups. For instance, as described with regard to FIG. 2, each remote access controller within a cluster may utilize a network adapter that supports remote management network connections for use in communicating with other remote access controllers within the cluster. Accordingly, in some embodiments, a designated remote access controller in each cluster within the network may be configured to communicate with the other remote access controllers in order to identify all available disk groups within the cluster.

As part of this process, the designated remote access controller in each cluster may also collect trust parameters from each of the remote access controllers, where the trust characteristics reported by each remote access controller provide information regarding the server IHS that is managed by the remote access controller. In initiating a network-wide search for available disk groups outside of a local cluster, the designated remote access controller of the local cluster may utilize its network management networking capability to contact the designated remote access controllers for each cluster on the network. Upon identifying the available disk groups within its cluster and collecting the trust parameters, each of the designated remote access controllers may report this information to the requesting designated remote access controller. Once server IHSs with available disk groups have been identified within the network, the designated remote access controller may load the trust parameters that were reported for each of the available disk groups. The reported trust parameters characterize various security and operational characteristics of the server IHS that host the available disk groups.

In some embodiments, the trust parameters for evaluating the servers may include information regarding the network hardware utilized by a server IHS. For instance, the trust parameter may report the network devices, such as network switches, that provide a server with network access. In data center scenarios where server IHSs are installed within racks, an IHS may be coupled to external networks via switches or other network devices of a rack. In such scenarios, the trust parameters reported by a remote access controller may include these switches or other network devices utilized by the server. Switches may be deemed to be trusted to varying degrees based on various factors, such as based on security protocols enforced by a switch, software used to operate a switch, hardware components (e.g., a TPM, a cryptographic processor) of a switch and/or the model number of a switch. In some embodiments, the reported trust parameters may include information regarding networks associate with a server IHS. For instance, a server IHS may operate as part of one or more network domains or using one or more directory services. Network domains may implement security policies for authenticating members of the network. As such, certain recognized network domains that implement robust security protocols may be trusted, while IHSs that are members of domains with unknown or inadequate security protocols may deemed untrustworthy.

In some embodiments, the trust parameters used for evaluating servers that include available disk groups may include configurations of the server. In a data center environment, a server IHS may be optimized for certain computational tasks. In some instances, a sever IHS may be optimized in this manner as part of its manufacture. For instance, a server IHS may be optimized for supporting computation tasks such as data storage, virtualized computing, e-commerce, artificial intelligence, data mining, where the server may be manufactured with various hardware and software that optimizes it for these computing tasks. Accordingly, a remote access controller may be configured to report such optimizations as trust parameters for a server IHS. In some instances, such optimizations may be reported as model information or as service tag information. In some embodiments, optimization information reported as trust parameters may include BIOS configurations that may be used to configure an IHS to support different types of workloads, such as configurations that specify deference for use of processing resources for computational tasks rather than storage tasks. BIOS configurations may also specify various other trust parameters, such as use of memory resources, networking protocols and/or security protocols.

In some embodiments, the trust parameters used for evaluating servers that include available disk groups may include security characteristics of the server. For instance, a server IHS may report trust parameters indicating whether it includes a TPM (Trusted Platform Module) that is configured to verify the integrity of software used by certain components of an IHS. In some instances, an IHS may include a TPM controller that calculates signatures based on firmware and other code or settings in use by a hardware component. The calculated signatures are compared against the reference signatures for these components in order to determine if any modifications have been made to a component, thus indicating the component has been compromised. In some embodiments, the trust parameters may indicate security protocols that are used such as TLS (Transport Layer Security) settings that specify the version of TLS that is used by the server and/or encryption cyphers that are used. In some embodiments, the trust parameters may indicate security protocols such as supported FIPS (Federal Information Processing Standards) configurations. In some embodiments, the trust parameters may indicate specific security improvements by a server, such as the presence of a mechanism implemented by the remote access controller for disabling use of a server's debug port without an administrator adhering to stringent security requirements implemented by the firmware of the remote access controller. In another example, a specific security improvement may include intrusion detection protocols that prevent undetected physical tampering with a server.

Upon loading such trust parameters collected from throughout the network, at block 340, the server IHSs with available disk groups may be classified according to these trust parameters. Some embodiments may classify the servers using a clustering algorithm such as KNN or DBSCAN. Using such types of classification algorithms, each server with available disk groups is assigned to one or more trust parameter classifications. In some embodiments, the classification of a server in a trust parameter classification is based on the configuration parameters of that server. For instance, when evaluating a BIOS configuration trust parameter, a server may be classified within this trust parameter if the server utilizes a reference BIOS configuration, such as a BIOS configuration optimizing a server for data storage capabilities, whereas the server is not classified with this trust parameter if the server utilizes a different BIOS configuration, such as a BIOS configuration optimizing the server for processing capabilities. In this manner, each of the servers with available disk groups may be classified according to various trust parameters.

At block 345, each of the servers with available disk groups may then be ranked according to these trust parameter classifications. In some embodiments, servers may be ranked according to the number of trust parameter classifications of each cluster that resulted from the classification algorithm. For instance, a server that was classified in more trust parameters groups than other servers may be the highest ranked of the available servers. Based on these rankings, at block 350, the highest ranked server is identified, and the available disk groups of this server may be designated for addition to the data storage system. In this manner, disk groups may be identified for addition to a data storage system in scenarios where there are no available disk groups within the trusted cluster of the data storage system, where the available disk groups are classified according to the level of trust of the servers in which these disk groups are installed.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A data storage system comprising a first cluster of (Information Handling Systems), each comprising a plurality of disk groups providing storage capacity to the storage system, wherein the data storage system is configured to:
   detect, by a first IHS of the data storage system, a request for an additional disk group to be added to the data storage system;
   identify, by the first IHS of the data storage system, a plurality of external IHSs that are not members of the cluster and that are accessible by the data storage system, wherein the external IHSs include one or more disk groups available for assignment within the data storage system;
   query, by a remote access controller of the first IHS, a plurality of trust parameters from each of the external IHSs that are not members of the cluster and that include disk groups available for assignment, wherein the queried trust parameters that are reported by each respective external IHS indicate security characteristics of hardware and software utilized by each respective external IHS, and wherein the trust parameters of each respective external IHS are collected and reported by a remote access controller of each respective external IHS;
   classify the plurality of external IHSs based on the plurality of trust parameters reported by the remote access controller of each respective external IHS;
   rank the plurality of external IHSs based on the classification of trust parameters reported by the remote access controller of each respective external IHS; and
   identify a top ranked disk group of the external IHSs for use by the storage system.

2. The data storage system of claim 1, wherein the data storage system comprises a vSAN (virtual Storage Area Network) storage system.

3. The data storage system of claim 1, wherein the trust parameters reported to the first IHS of the data storage system by the remote access controller of a respective external IHS in response to the query from the remote access controller comprise a plurality of BIOS settings of the external IHS.

4. The data storage system of claim 1, wherein the trust parameters reported to the first IHS of the data storage system by the remote access controller of a respective external IHS in response to the query from the remote access controller comprise use of a TPM (Trusted Platform Module) controller by the external IHS.

5. The data storage system of claim 1, wherein the trust parameters reported to the first IHS of the data storage system by the remote access controller of a respective external IHS in response to the query from the remote access controller comprise network switches utilized by the external IHS.

6. The data storage system of claim 1, wherein the remote access controller of each respective external IHS utilizes a plurality of sideband monitoring connections for collecting the trust parameters from internal components of the respective external IHS.

7. The data storage system of claim 1, wherein access controller of a first IHS queries the trust parameters from the remote access controllers of each respective external IHS via remote management network interfaces that are separate from network interfaces used by operating systems of each respective external IHS.

8. An IHS (Information Handling System) that is a member of a first cluster of IHSs that implement a data storage system comprising a plurality of disk groups providing storage capacity, wherein the IHS is configured to:
- detect a request for an additional disk group to be added to the data storage system;
- identify a plurality of external IHSs that are not members of the cluster, wherein the external IHSs include one or more disk groups available for assignment;
- query, by a remote access controller of the IHS, a plurality of trust parameters from each of the external IHSs that are not members of the cluster and that include disk groups available for assignment, wherein the queried trust parameters that are reported by each respective external IHS indicate security characteristics of hardware and software utilized by each respective external IHS, and wherein the trust parameters of each respective external IHS are collected and reported by a remote access controller of each respective external IHS;
- classify the plurality of external IHSs based on the plurality of trust parameters reported by the remote access controller of each respective external IHS;
- rank the plurality of external IHSs based on the classification of trust parameters reported by the remote access controller of each respective external IHS; and
- identify a top ranked disk group of the external IHSs for use by the storage system.

9. The IHS of claim 8, wherein the data storage system comprises a vSAN (virtual Storage Area Network) storage system.

10. The IHS of claim 8, wherein the trust parameters reported to the first IHS of the data storage system by the remote access controller of a respective external IHS in response to the query from the remote access controller comprise a plurality of BIOS settings of the external IHS.

11. The IHS of claim 8, wherein the trust parameters reported to the first IHS of the data storage system by the remote access controller of a respective external IHS in response to the query from the remote access controller comprise use of a TPM controller by the external IHS.

12. The IHS of claim 8, wherein the trust parameters reported to the first IHS of the data storage system by the remote access controller of a respective external IHS in response to the query from the remote access controller comprise characteristics of a network switch utilized by the external IHS.

13. The IHS claim 8, wherein the remote access controller of each respective external IHS utilizes a plurality of sideband monitoring connections for collecting the trust parameters from internal components of the respective external IHS.

14. A method for supporting a data storage system comprising a cluster of IHSs (Information Handling Systems), each comprising a plurality of disk groups providing storage capacity to the storage system, the method comprising:
- detecting, by a first IHS of the cluster of IHSs, a request for an additional disk group to be added to the data storage system;
- identifying, by the first IHS of the cluster IHSs, a plurality of external IHSs that are not members of the cluster and that are accessible by the storage system, wherein the external IHSs include one or more disk groups available for assignment;
- querying, by a remote access controller of the first IHS, a plurality of trust parameters from each of the external IHSs that are not members of the cluster and that include disk groups available for assignment, wherein the queried trust parameters that are reported by each respective external IHS indicate security characteristics of hardware and software utilized by each respective external IHS, and wherein the trust parameters of each respective external IHS are collected and reported by a remote access controller of each respective external IHS;
- classifying the plurality of external IHSs based on a plurality of trust parameters of the external IHSs;
- ranking the plurality of external IHSs based on the classification; and
- identifying a top ranked disk group of the external IHSs for use by the storage system.

15. The method of claim 14, wherein the data storage system comprises a vSAN (virtual Storage Area Network) storage system.

16. The method of claim 14, wherein the trust parameters reported to the first IHS of the data storage system by the remote access controller of a respective external IHS in response to the query from the remote access controller comprise a plurality of BIOS settings of an external IHS.

17. The method of claim 14, wherein the trust parameters reported to the first IHS of the data storage system by the remote access controller of a respective external IHS in response to the query from the remote access controller comprise use of a TPM (Trusted Platform Module) controller by an external IHS.

18. The method of claim 14, wherein the trust parameters reported to the first IHS of the data storage system by the remote access controller of a respective external IHS in response to the query from the remote access controller comprise network switches devices utilized by an external IHS.

19. The method of claim 14, wherein the remote access controller of each respective external IHS utilizes a plurality of sideband monitoring connections for collecting the trust parameters from internal components of the respective external IHS.

* * * * *